US012646672B2

(12) United States Patent
Bachmann et al.

(10) Patent No.: US 12,646,672 B2
(45) Date of Patent: Jun. 2, 2026

(54) CIRCUIT BREAKER COMPENSATION BIMETAL OF A THERMAL TRIPPING MECHANISM

(71) Applicant: Rockwell Automation Switzerland GmbH, Aarau (CH)

(72) Inventors: Markus Bachmann, Wölflinswil (CH); Sadashiv Pimple, Zuchwil (CH); Rahel J. von Arx, Schinznach-Dorf (CH); Valentin Kilchenmann, Oftringen (CH)

(73) Assignee: Rockwell Automation Switzerland GMBH, Aarau (CH)

( * ) Notice: Subject to any disclaimer, the term of this patent is extended or adjusted under 35 U.S.C. 154(b) by 260 days.

(21) Appl. No.: 18/506,006

(22) Filed: Nov. 9, 2023

(65) Prior Publication Data

US 2025/0157763 A1 May 15, 2025

(51) Int. Cl.
*H01H 37/52* (2006.01)

(52) U.S. Cl.
CPC .................................. *H01H 37/52* (2013.01)

(58) Field of Classification Search
CPC ...... H01H 37/52; H01H 71/162; H01H 73/30; H01H 71/16; H01H 71/58
See application file for complete search history.

(56) References Cited

U.S. PATENT DOCUMENTS 2,795,670 A * 6/1957 Cellerini .............. H01H 71/162 335/22
2,813,167 A * 11/1957 Bingenheimer ..... H01H 71/405 337/99
3,665,360 A * 5/1972 Norden .................. H01H 89/04 337/100
7,570,146 B2 * 8/2009 Mills ...................... H01H 71/04 337/79
9,711,307 B2 * 7/2017 Weiden .................. H01H 37/52
11,031,191 B2 6/2021 Pinero
2009/0128077 A1 * 5/2009 Kawata ................ H01H 71/162 337/14

(Continued)

FOREIGN PATENT DOCUMENTS

DE 102008020453 A1 * 10/2008 ......... H01H 71/1081
IT 1101591 B * 10/1985 ........... H01H 71/161
JP 2002298723 A * 10/2002 ........... H01H 83/223

OTHER PUBLICATIONS

"Tripping device for an overload circuit breaker", Oct. 7, 1985, Ellenberger & Poensgen GMBH, Translation of (IT1101591). (Year: 1985).*

(Continued)

*Primary Examiner* — Stephen S Sul

(57) ABSTRACT

A compensation bimetal having at least two bends configured to reverse the direction of the compensation bimetal to form "S" curves is disclosed. The first end of the compensation bimetal is coupled with a differential lever while the second end is coupled with a tripping pin, and the length of the multi-metallic strip is greater than the distance between the differential lever and the tripping pin. The compensation bimetal may be bimetallic, trimetallic strip, or tetra-metallic. The compensation bimetal with the described configuration compensates for a greater range of ambient temperature fluctuations while preserving sensitivity to thermal tripping due to over-current conditions.

19 Claims, 8 Drawing Sheets

(56) References Cited

U.S. PATENT DOCUMENTS

| | | | |
|---|---|---|---|
| 2020/0027678 A1 | 1/2020 | Gibson | |
| 2025/0118516 A1* | 4/2025 | Cho | H01H 71/16 |
| 2025/0157772 A1 | 5/2025 | Urech | |

OTHER PUBLICATIONS

Nagahiro Isamu; Kuboyama Katsunori; Shizuka Takashi, "Overload/Phase Interruption Tripping Device of Circuit Breaker", Oct. 11, 2002, Fuji Electronic Co. Ltd., Entire Document (Translation of JP2002298723) (Year: 2002).*

Pump, Wolfgang, ; Majewski, Joachim, "Installation switching device . . . between compensation and thermo bimetals", Oct. 30, 2008, ABB AG, Entire Document (Translation of DE102008020453). (Year: 2008).*

* cited by examiner

CIRCUIT BREAKER COMPENSATION BIMETAL OF A THERMAL TRIPPING MECHANISM

INCORPORATIONS

The following U.S. patent applications, each of which are filed concurrently with the present application, are incorporated by reference herein in their entireties for all purposes: Ser. No. 18/505,948, titled "CIRCUIT BREAKER INTERLOCK MECHANISM," Ser. No. 18,505,967, titled "CIRCUIT BREAKER LINEAR LEVER AND TRIPPING FORK MECHANISM," and Ser. No. 18/505,989, titled "CIRCUIT BREAKER TRIPPING MECHANISM." Each of the applications describe features of a circuit breaker, all of which can be incorporated into a single circuit breaker to obtain the benefit of each of the described features.

TECHNICAL FIELD

Various embodiments of the present technology generally relate to thermal tripping mechanisms in circuit breakers. More specifically, a compensation bimetal is designed to account for ambient temperature fluctuations in a circuit breaker while still allowing for tripping based on small temperature fluctuations in the circuit breaker components indicating an overload.

BACKGROUND

Circuit breakers are electrical switching devices designed to protect electrical circuits from damage that can be caused by short circuits or overloads. Circuit breakers may be implemented in industrial environments as components of electrical circuits. When a circuit breaker is turned on, an electrical connection is created by bringing sets of metal contacts into contact with one another to allow the flow of current through the circuit. When the device is turned off, the metal contacts are separated to interrupt the flow of current in the circuit. Circuit breakers may be manually or automatically operated to switch the device between states.

One style of circuit breaker incorporates thermal techniques to manage over-current circumstances. One technique may involve using the properties of bimetallic strips. A bimetallic strip is composed of two distinct metals, such as steel and copper, physically joined together and each having a different coefficient of thermal expansion. When heated, the metal with a lower coefficient of thermal expansion expands less than the metal with a higher coefficient of thermal expansion, causing mechanical displacement of the strip which can be thought of as a flexing motion. In other words, when the strip, if laid flat, is heated, both ends of the strip will curl in one direction. However, if cooled, both ends of the strip will curl in the opposite direction. By coupling one end of a bimetallic strip to a component that may experience heating from over-current, the strip can flex in response to the thermal changes. This flexing can be used to force other mechanical motions within the circuit breaker to stop current flow through the circuit breaker.

In operation, circuit breakers are known to face certain challenges. One challenge relates to compensating for ambient temperature changes. Current flow through a circuit breaker may generate heat as a natural result of resistive losses in conductive components, heating up both nearby components and generating ambient heat inside the circuit breaker. However, ambient environmental heat can deform a bimetallic strip sufficiently to cause the circuit breaker to trip without an overload condition. Accordingly, techniques and components are needed to avoid ambient temperature fluctuations causing the circuit breaker to incorrectly trip and interrupt the flow of current when no overload condition exists.

It is with respect to this general technical environment that aspects of the present technology disclosed herein have been contemplated. Furthermore, although a general environment has been discussed, it should be understood that the examples described herein should not be limited to the general environment identified in the background.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments of the present technology generally relate to a feature of industrial circuit breakers. More specifically, a mechanism is disclosed that compensates for a broad range of ambient temperature changes in a circuit breaker while preserving the mechanical properties of components used to perform the safety functions of a circuit breaker. In an embodiment of the present technology, a circuit breaker has an on mode, an off mode, and a trip mode. The circuit breaker includes a switch mechanism. Current flows through the switch mechanism when the circuit breaker Is in the on mode and current flow is stopped via the switch mechanism when the circuit breaker is in the off mode or the trip mode. The circuit breaker includes components for a thermal tripping mechanism including a working bimetal, a differential lever, a compensation bimetal, a latch, and a latch lever. The working bimetal is a multi-metallic strip. One end of the multi-metallic strip is coupled with the switch mechanism. The second end of the multi-metallic strip is coupled with the differential lever. The differential lever acts as a mechanical intermediary between the working bimetal and the compensation bimetal so that movement in the working bimetal is translated to movement in the compensation bimetal. The compensation bimetal is a multi-metallic strip with one end coupled with the differential lever and the second end coupled to a tripping pin. The compensation bimetal compensates for ambient temperature changes in the circuit breaker so that a thermal trip does not occur based on ambient temperature changes. The compensation bimetal includes an "S" curve, which extends the length of the compensation bimetal, allowing greater compensation for ambient temperature changes while still ensuring sufficient sensitivity for over-current conditions that cause thermal increases in the working bimetal to trigger a thermal trip. The tripping pin attached to the compensation bimetal is in physical contact with the latch, which is in physical contact with the latch lever. When the circuit breaker is in the on mode, the latch lever is held in position by the latch. When a trip occurs due to thermal changes in the working bimetal, the latch lever rotates into a position associated with a trip of the circuit breaker.

Regarding over-current conditions, monitoring a wide range of ambient temperature changes is beneficial. An over-current condition is a situation where the amperage of the current flowing through the switching mechanism slowly increases over time. Over-current conditions are problematic for multiple reasons. For example, the ohmic relationship between the increasing amperage on a given conductor, the voltage of the source, and the conductor's resistance results in heat losses too great for the material of the given conductor. Over-current conditions can result in destroyed components that no longer function and deformed components that no longer function as expected. Further, over-current conditions can create safety issues for technicians and users. Circuit breakers are commonly used in industrial applications having significant power needs, such as manufacturing, automotive, or data service applications.

Typical operation of the circuit breaker may generate heat. Additionally, some industrial applications require that the circuit breaker itself be located in an environment with fluctuating ambient temperatures. As such, circuit breakers with an expanded ability to compensate for ambient temperature fluctuations, and therefore an increased range of applications, are a valuable improvement over-current technology.

Compensation bimetal is a solution to fluctuating ambient temperatures in a circuit breaker. In an example embodiment of the disclosed technology, a circuit breaker has a working bimetal that flexes under ambient temperature fluctuation. In this example, no over-current conditions are present. In some examples, the circuit breaker is located in an industrial environment that may experience shifts between a relatively high temperature and a relatively low temperature, resulting in ambient temperature fluctuations within the circuit breaker. Here, temperature fluctuations cause the working bimetal to flex. Similarly, the compensation bimetal flexes in response to the ambient temperature fluctuations. Note that the ambient heat experienced by the components in this example is below a threshold value, meaning it is not associated with a short-circuit surge of current or else over-current conditions. Here, the compensation bimetal is configured so that where the working bimetal flexes under ambient temperature change, the compensation bimetal reciprocally flexes to compensate. This reciprocal compensation preserves the mechanical relationship between working bimetal, differential lever, compensation bimetal, latch, and latch lever, which allows for over-current detection and entry into a trip of the circuit breaker where necessary, without incorrectly tripping based on ambient temperature changes that fall below a threshold, thereby causing insufficient flexing of the working bimetal to move the compensation bimetal and associated latch sufficiently to release the latch lever to enter the trip mode. Without the compensation of the compensation bimetal, fluctuations in ambient temperature can trigger a trip within the circuit breaker. The extent to which the compensation bimetal can flex while still maintaining this series of mechanical interactions is determined based on a combination of the material used for the compensation bimetal, the length of the compensation bimetal, and the thickness of the compensation bimetal. However, the physical footprint of the circuit breaker can limit the length and thickness values. The longer the compensation bimetal, the thicker it can be while still maintaining the appropriate level of flexing under various operating temperatures. Further, a longer bimetallic strip flexes in expanded temperature ranges, making it more sensitive to smaller temperature changes and allowing for increased flexing due to larger temperature changes. To increase the length of the compensation bimetal as disclosed in more detail throughout, the compensation bimetal length is increased by reversing the direction multiple times in an "S" shape. By extending the length, the thickness can be increased, and the greater the range of ambient temperature fluctuations can be compensated for by the compensation bimetal.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
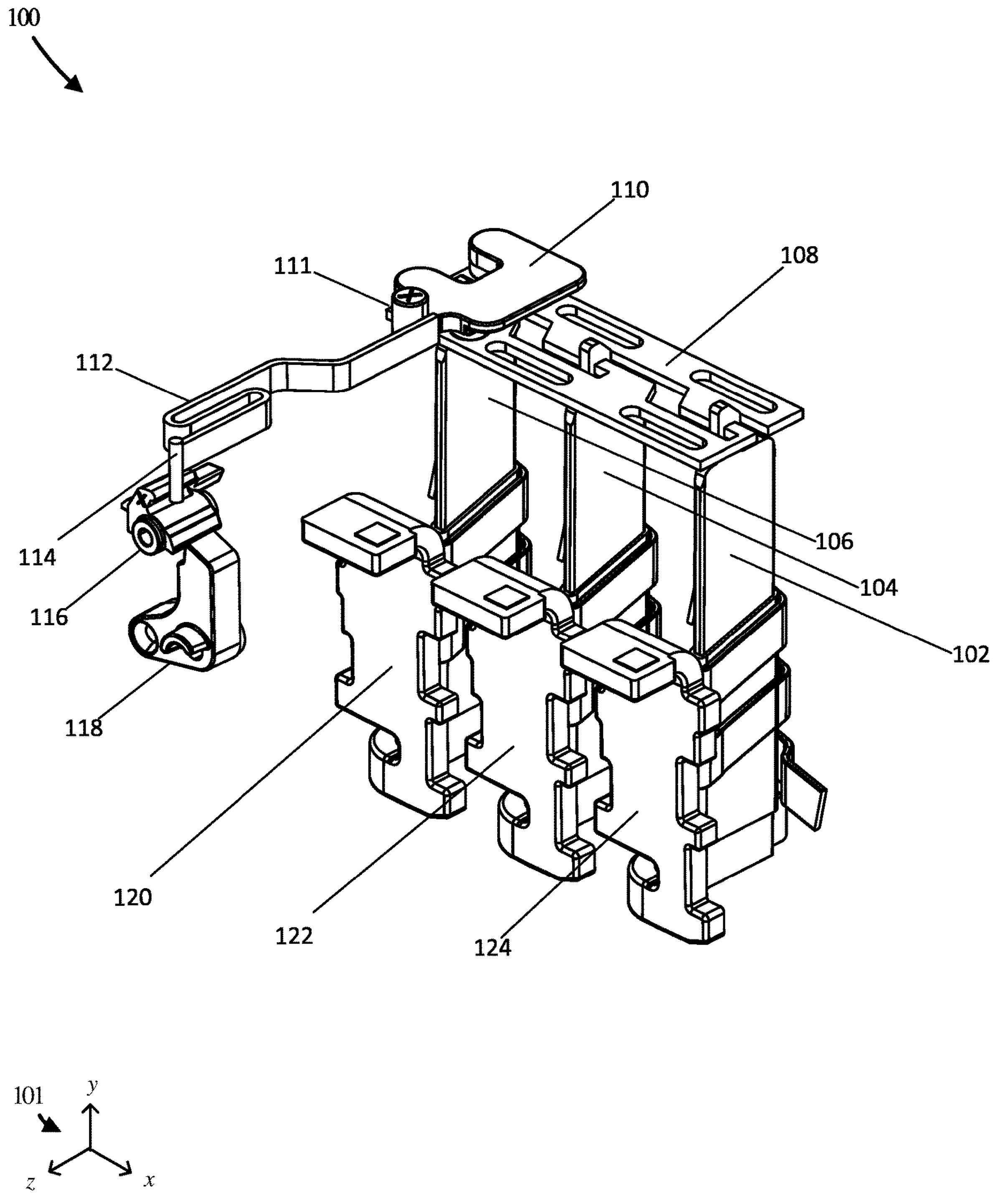
FIG. 1 illustrates a circuit breaker compensation bimetal mechanism, according to some embodiments.

As described above, disclosed herein is a compensation bimetal that advantageously incorporates a longer component having bimetallic properties to account for an expanded range of ambient temperature fluctuations than previous technologies while preserving the ability to fit within the small footprint of a circuit breaker. An embodiment of the technology disclosed herein functions to compensate for ambient temperature fluctuations within a circuit breaker while still sensing over-current conditions. Accordingly, the circuit breaker will experience a tripping event due to over-current without being overly sensitive to ambient temperature changes. Ambient temperature is the temperature of the air in and around the circuit breaker. However, over-current can increase over time, slowly increasing temperatures of the working bimetal in the circuit breaker and causing the tripping event. Bimetallic strips are used to sense the increased temperature, which the bimetallic strip translates to physical displacement. Heat created by over-current conditions and the subsequent physical displacement of the bimetallic strip are used as a mechanical catalyst to trip the circuit breaker and stop current flow.

In addition to heat generated by resistive losses, environmental temperatures are also relevant. Environments that would otherwise benefit from the use of circuit breakers with thermal sensing technology may not be appropriate for existing circuit breaker technology because of the ambient heat generated in the environment. In, for example, a manufacturing facility that relies on casting liquid metals at high temperatures, a circuit breaker using thermal tripping mechanisms may not experience a tripping event (i.e., the circuit breaker trips and stops current flow) correctly due to the significant increases and decreases in environmental temperature (e.g., tripping events may occur frequently due to ambient temperature fluctuations rather than over-current conditions). Compensation systems have been used to remedy this problem to some degree, but existing technologies remain limited in their range of applications.

The working bimetal and compensation bimetal components of a circuit breaker have dual functions. Together, they must act in concert to adjust for ambient temperatures, and they must remain able to actuate the tripping pin, latch, and latch lever for a trip of the circuit breaker. To extend the range of temperatures that this system can accommodate for while still having the ability to trigger a trip of the circuit breaker, a compensation bimetal that is longer and has a unique geometry is used to more effectively compensate for an expanded range of ambient temperature changes.

The disclosed compensation bimetal includes a geometry designed for ensuring small temperature fluctuations in the circuit breaker components due to over-current conditions trigger the circuit breaker components to stop current flow while compensating for ambient temperature fluctuations that should not stop current flow. The compensation bimetal is composed of a multi-metallic strip which could be a bimetallic strip, a trimetallic strip, or a tetra-metallic strip. Strips of bimetallic material, or else tri- or tetra-metallic materials, are classified in part based on their operating temperatures and mechanical deflection.

The compensation bimetal length is increased by bending it at least twice to form an "S" shape. Accordingly, the centroids of the bends are coplanar, the bends are 180-degree reversals of the strip, and they have radii that are substantially the same. In some embodiments, the radii are as small as possible while the bends remain uniform, the centroids of the at least two bends remain coplanar, and the material is not pinched at the apex of the at least two bends.

In the circuit breaker a working bimetal is configured to actuate (flex) due to thermal changes, which include ambient temperature changes and over-current thermal increases sensed because the working bimetal is conductively coupled to the switching mechanism through which current flows. when current flow through the circuit breaker generates thermal increases. The working bimetal is made up of a bimetallic strip with a first end and a second end, the first end coupled to a switch mechanism and the second end coupled to a differential lever. The circuit breaker includes a first set of conducting contacts and a second set of conducting contacts that are part of the switching mechanism. The first set of contacts are statically coupled to the first end of the working bimetal, and the second set of contacts are fixed to a moveable conducting switch element. The switch mechanism allows current flow when the circuit breaker is in an on mode by joining the first set of conductive contacts and the second set of conductive contacts. When the circuit breaker is in an off mode of normal operation or experiences a trip of the circuit breaker, the first set of conductive contacts and the second set of conductive contacts are separated, and thus current flow is stopped.

When the working bimetal of the circuit breaker actuates (i.e., flexes) in response to current flow through the circuit breaker passing a predetermined threshold, the actuation of the working bimetal causes the actuation of the differential lever. The actuation of the differential lever causes the actuation of the compensation bimetal, which in turn actuates the tripping pin. In an over-current condition, the movement of the differential lever will be larger than the compensation bimetal is configured to compensate for. Under these conditions, the tripping pin will exceed a threshold movement.

Movement of the tripping pin exceeding the threshold movement results in contact to and rotation of a latch, where rotation of the latch allows a previously impeded latch lever to move to a position associated with a trip of the circuit breaker.

However, when the working bimetal actuates in response to ambient temperature fluctuations instead of from current flow through the circuit breaker reaching a predetermined threshold (i.e., an over-current condition), the actuation of the working bimetal still causes the actuation of the differential lever. The compensation bimetal, however, is not moved sufficiently to cause a tripping event. This is because, the compensation bimetal is configured so that where the working bimetal flexes under ambient temperature change and subsequently displaces the differential lever, the compensation bimetal reciprocally flexes to compensate for the movement of the differential lever.

In some embodiments, the compensation bimetal of the circuit breaker is contained within a holder. The compensation bimetal holder has a fixed fulcrum within the closed interior volume and openings in the sides. The compensation bimetal is not anchored in place within the compensation bimetal holder, rather the sides of the compensation bimetal holder and the fixed fulcrum keep the multi-metallic strip in a stable orientation while also allowing the bidirectional displacement of the first end and the second end of the multi-metallic strip. Accordingly, the compensation bimetal is self-aligning within the compensation bimetal holder. The first end and the second end of compensation bimetal are exposed through the openings in the side of the compensation bimetal holder, which allows them both to flex without obstruction and to couple with other components of the circuit breaker. Bidirectional displacement of the compensation bimetal includes flexing under ambient temperatures and actuation in response to over-current. Where ambient temperature fluctuations cause a movement of the tripping pin that does not exceed a threshold movement, the multi-metallic strip flexes inside the compensation bimetal housing so that it remains able to actuate. When the tripping pin actuates in response to over-current, the configuration of the fixed fulcrum of the compensation bimetal housing causes a lever effect between the first end and second of the compensation bimetal, causing the tripping pin to exceed a threshold movement and rotate the latch. This then allows the movement of the latch lever, culminating in a trip of the circuit breaker. In a further embodiment, a first bend of the at least two bends in the multi-metallic strip of the compensation bimetal has an apex proximate to a closed portion of the side of the compensation bimetal holder, and a second bend of the at least two bends in the multi-metallic strip of the compensation bimetal has an apex proximate to the fixed fulcrum.

The technology described herein represents an improvement over existing technology due to an increased ability to compensate for ambient temperatures. A circuit breaker employing the improved ambient temperature compensation technology can preserve thermal sensing safety features in a wider range of environments and therefore enjoys an increased range of applications. The addition of the bends (i.e., the "S" shape) increases the ability of compensation bimetal to flex under ambient temperatures compared to a compensation bimetal having no bends. By introducing a first bend and a second bend, the amount of expansion required to deform the strip beyond the ability to actuate tripping pin more than a threshold movement is increased. Further, the opposing concavity of the first bend and second bend increase the ability to deform while preserving the ability to actuate tripping pin more than a threshold movement, as their displacements partially cancel each other when considered from the perspective of tripping pin. Further, the compensation bimetal housing allows the compensation bimetal to be self-aligning. This improvement allows for easier manufacturing of the circuit breaker since the compensation bimetal does not have to be fixed or attached to anything. Self-alignment without fixing the compensation bimetal to another component further ensure the compensation bimetal has an improved operating range and increased sensitivity to ambient temperature fluctuations that allow it to compensate more effectively to ambient temperature changes.

Referring now to the drawings, FIG. 1 illustrates a portion of a circuit breaker 100 including a compensation bimetal mechanism that compensates for ambient temperature changes in the thermal tripping mechanism. Circuit breaker 100 includes working bimetals 102, 104, and 106, differential rail 108, differential lever 110, compensation bimetal 112, tripping pin 114, latch 116, latch lever 118, and working bimetal mounts 120, 122, and 124. FIG. 1 further includes axes 101, in reference to which elements of FIG. 1 are described.

Working bimetals 102, 104, 106 are each made of a multi-metallic strip (e.g., bimetallic, trimetallic, tetra-metallic). Multi-metallic strips are composed of at least two metals, such as steel and copper, physically joined together and each having a different coefficient of thermal expansion. For example, TB 150, TB 200, or any other class of multi-metallic strips may be used. When heated, the metal with a lower coefficient of thermal expansion expands less than the metal with a higher coefficient of thermal expansion. Accordingly, when the temperature fluctuates, the multi-metallic strip flexes such that the ends of the strip start to curl toward each other. As the temperature rises, the ends curl toward each other in one direction, and when the temperature decreases, the ends curl toward each other in the opposite direction. Accordingly, as depicted in FIG. 1, working bimetal 102, 104, 106 flex such that the ends flex in the +x direction when temperatures increase and flex in the −x direction when temperatures decrease. Working bimetals 102, 104, 106 are coupled to differential rail 108 on one end and extend in the −y direction to the second end that are coupled to a switch mechanism (not shown, see FIGS. 2A-2C). Working bimetals 102, 104, 106 have a length extending from the first end to the second end along the y axis, a width that extends along the z axis, and a thickness that extends along the x axis.

Differential rail 108 is designed to couple one end of the working bimetal 102, 104, 106, so that flexing of one or more of the working bimetal 102, 104, 106 shifts differential rail 108 in the direction of flexing (i.e., either the +x or the −x direction). Differential rail 108 may be made of any non-conductive material (e.g., plastic). Differential rail 108 may be made of material that is also resistive to thermal transmission or deformation so that as working bimetal 102, 104, 106 experience thermal fluctuations the thermal changes are not translated to differential rail 108, do not deform differential rail 108, and are not translated to any other component in physical contact with differential rail 108.

Differential lever 110 is coupled to differential rail 108 so that it shifts as differential rail 108 shifts. Further, differential lever 110 includes an extension 111 that can physically contact compensation bimetal 112. Differential lever 110 may be made of any non-conductive material (e.g., plastic). Differential lever 110 may be made of the same material or a different material used for differential rail 108. Differential lever 110 may be made of material resistive to thermal transmission or deformation to ensure differential lever 110 does not transmit thermal energy to compensation bimetal 112.

Compensation bimetal 112 is made of a multi-metallic strip. The multi-metallic strip used to make compensation bimetal 112 may be a different composition than the multi-metallic strips used for working bimetals 102, 104, 106. For example, TB 150, TB 200, or any other class of multi-metallic strips may be used. Compensation bimetal 112 may flex in response to ambient temperature changes. For example, as the ambient temperature increases, the ends of compensation bimetal 112 may flex in the +x direction, and as the ambient temperature decreases, the ends of compensation bimetal 112 may flex in the −x direction. The first end of compensation bimetal 112 may contact differential lever 110, and compensation bimetal 112 extends in the +z direction to the second end, which is coupled to tripping pin 114. Compensation bimetal 112 has a length extending from the first end to the second end along the z axis, a width that extends along the y axis, and a thickness that extends along the x axis. Accordingly, the length of compensation bimetal 112 is oriented perpendicular to the length of working bimetals 102, 104, 106.

Tripping pin 114 may be made of any suitable material and shaped such that it extends in the −y direction from the second end of compensation bimetal 112. Tripping pin 114 may be coupled to compensation bimetal through any mechanical means. For example, tripping pin 114 may be welded to compensation bimetal 112. Tripping pin 114 may be coupled to compensation bimetal 112 using a removable means such as a screw.

Latch 116 includes a pivoting body with an extension that may physically contact tripping pin 114 as shown in FIG. 1. Latch 116 further includes a contact surface that physically touches a contact surface of latch lever 118 as shown in FIG. 1 when the latch lever 118 is in the on position. Latch 116 may be made of any suitable material including plastic, metal, or the like. Latch 116 is fixed at a center point of the pivoting body to pivot in response to movement of tripping pin 114. Sufficient movement of tripping pin 114 in the −x direction will push latch 116 to pivot around a z axis. Sufficient pivoting will release latch lever 118 as the contact surface of latch 116 pivots away from the contact surface of latch lever 118.

Figure 2A:
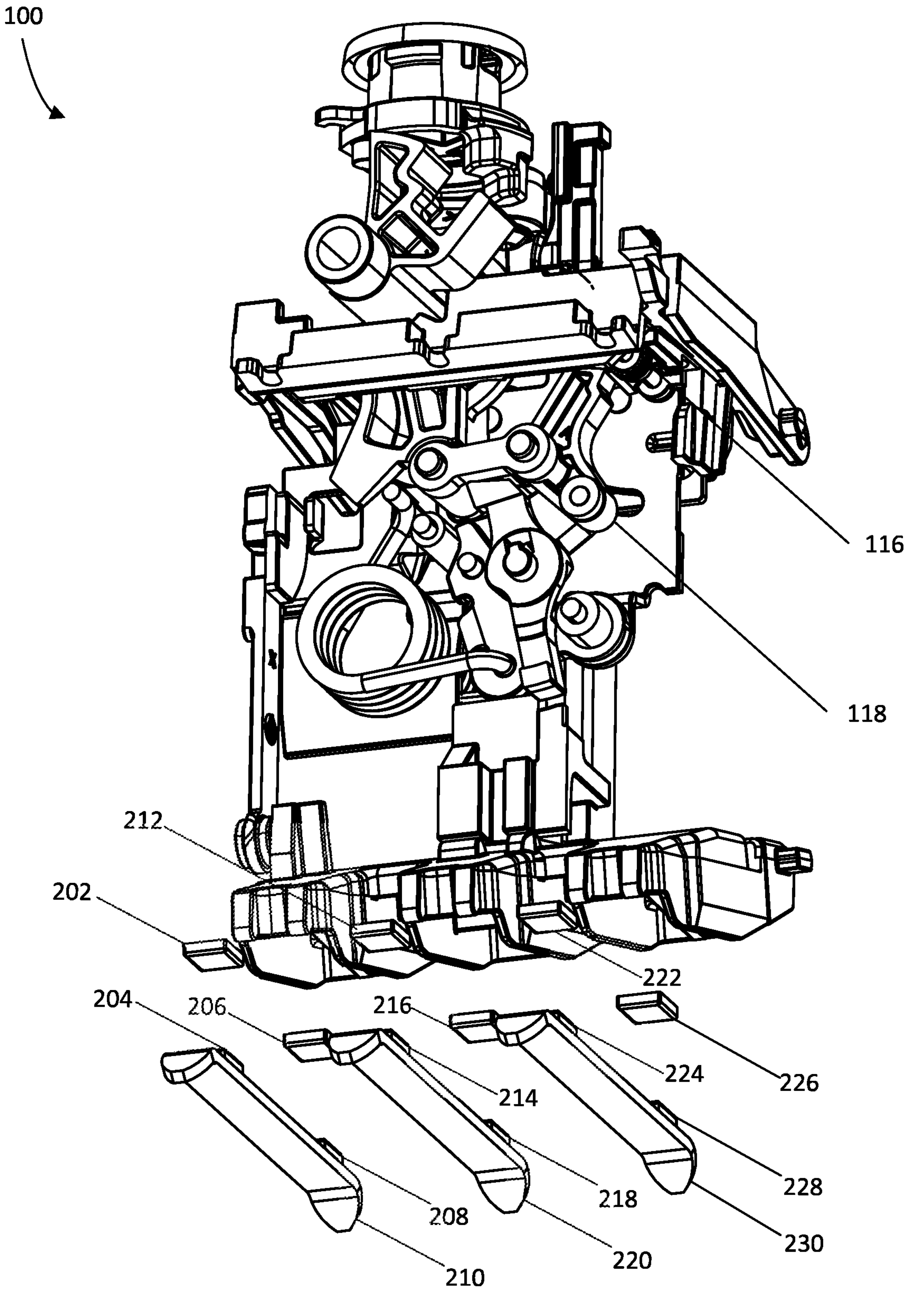
FIG. 2A illustrates a circuit breaker in an off mode, according to some embodiments.
Figure 2B:
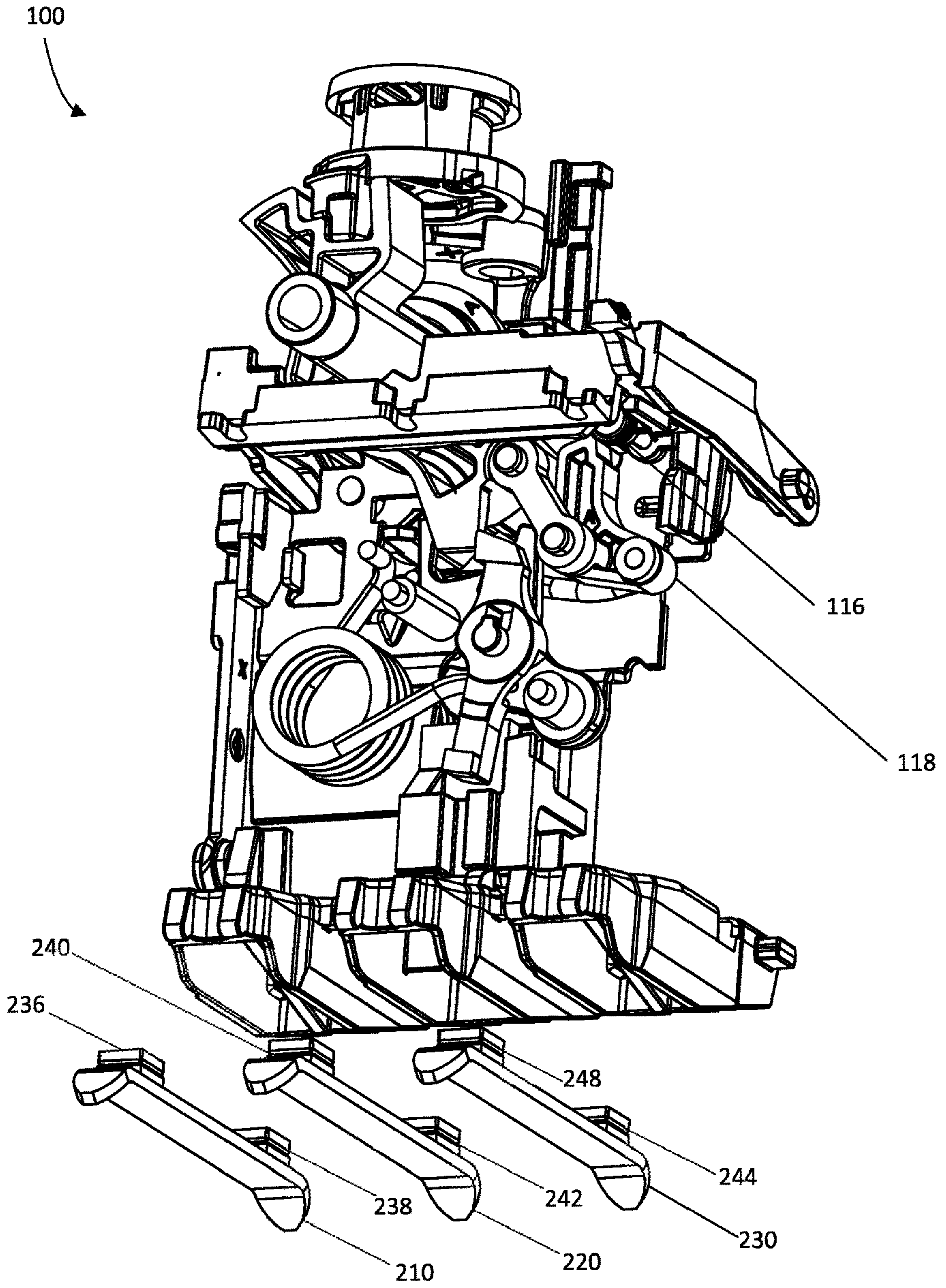
FIG. 2B illustrates a circuit breaker in an on mode, according to some embodiments.
Figure 2C:
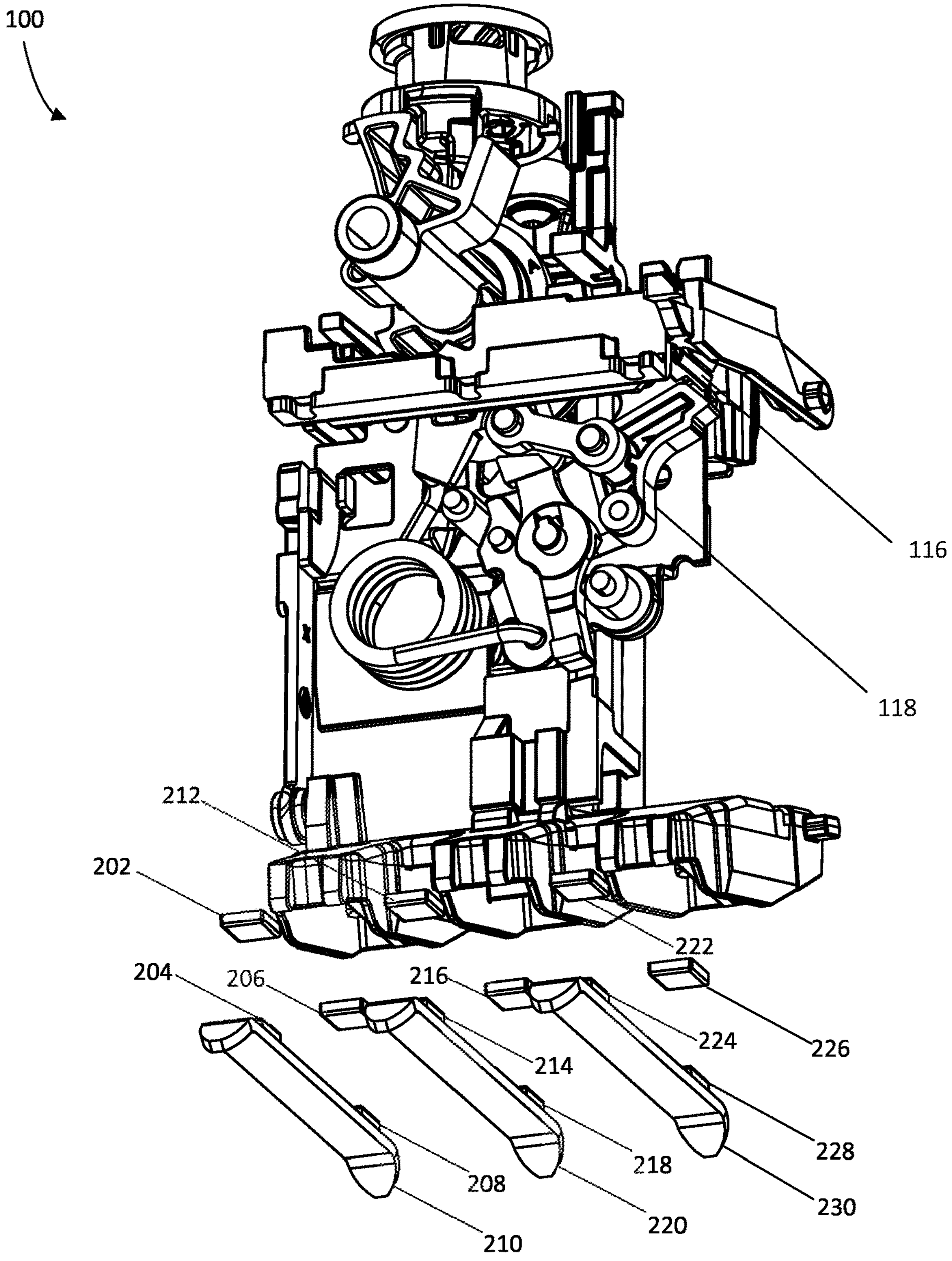
FIG. 2C illustrates a circuit breaker in a tripped mode, according to some embodiments.

Latch lever 118 is an “L” shaped lever that has multiple positions. In FIG. 1, latch lever 118 is in the on position. Also shown in FIGS. 2A-2C are the off position and the tripped position. Latch lever 118 may be made of any suitable material including plastic or metal.

Working bimetal mounts 120, 122, 124 hold working bimetal 102, 104, 106 to provide stability at a center of the working bimetal 102, 104, 106. Working bimetal mounts 120, 122, 124 may be made of any suitable material including plastic or metal.

In use, working bimetals 102, 104, and 106 flex in response to temperature fluctuations. As temperatures increase, working bimetal 102, 104, and 106 flex in the +x direction. The temperature increases may be ambient temperature increases, increases in thermal energy released from the switching mechanism, or a combination. As working bimetal 102, 104, and 106 flex in the +x direction, differential rail 108 slides in the +x direction. Differential lever 110 moves in unison with differential rail 108. The extension 111 of differential lever 110 pushes in the +x direction on compensation bimetal 112. This causes a lever action to occur on compensation bimetal 112 such that as extension 111 pushes in the +x direction on the first end of compensation bimetal 112, the second end coupled to tripping pin 114 moves in the −x direction. However, to compensate for ambient temperature increases, compensation bimetal 112 flexes on both ends in the +x direction. As compensation bimetal 112 flexes in the +x direction on both ends, the force exerted by differential lever 110 in the +x direction results in less movement of the tripping pin in the −x direction because the flexing of compensation bimetal 112 negates some of the movement in the +x direction. If the tripping pin moves sufficiently (e.g., above a threshold distance) in the −x direction, latch 116 will pivot enough to release the contact surface of latch lever 118 from the contact surface of latch 116, releasing latch lever 118 to rotate into the tripping position. In other words, when differential lever 110 via extension 111 moves compensation bimetal 112 sufficiently that tripping pin 114 exceeds a threshold movement, latch lever 118 is released to move into a position associated with a trip of circuit breaker 100. Ambient temperature increases are typically insufficient to force tripping pin 114 to exceed the threshold movement due to compensation bimetal 112. Temperature increases in the materials that are conductively coupled to the working bimetals 102, 104, 106 (e.g., the switch mechanisms) due to over-current conditions are not translated to compensation bimetal 112 directly because differential lever 110 is plastic or another non-conductive material. Therefore, compensation bimetal 112 flexes only in response to ambient temperature changes, where working bimetals 102, 104, 106 flex in response to ambient temperature changes and temperature changes due to current flow through the switch mechanism.

FIG. 2A illustrates a portion of a different interior view of circuit breaker 100 in an off state (i.e., turned off, in an off mode, with no current flow) in accordance with the technology disclosed herein. Circuit breaker 100 includes a first switch mechanism that has a first set of contacts 202 and 206, second set of contacts 204 and 208, and conducting switch element 210, a second switch mechanism that has a first set of contacts 212 and 216, second set of contacts 214 and 218, and conducting switch element 220, and a third switch mechanism that has a first set of contacts 222 and 226, second set of contacts 224 and 228, and conducting switch element 230. The view of circuit breaker 100 shown in FIG. 2A shows latch 116 in the off position and latch lever 118 in the off position corresponding to the circuit breaker being in the off mode.

The first set of contacts 202 and 206 of the first switch mechanism and the second set of contacts 204 and 208 of the first switch mechanism are made of conductive metal such as copper. Conducting switch element 210 of the first switch mechanism is also made of conductive metal such as copper. While the first set of contacts 202 and 206 appear as floating elements, they are each coupled to a conducting element (not shown to avoid impeding other displayed components). The conducting element coupled to contact 202 of the first set of contacts leads to an input of circuit breaker 100 and the conducting element coupled to contact 206 leads to an output of circuit breaker 100. The second switch mechanism and the third switch mechanism are each the same as the first switch mechanism, however each supports one phase of a three-phase power source and output as discussed in more detail with respect to FIG. 6.

In FIG. 2A, the off mode of the circuit breaker is demonstrated by the lack of physical contact, and therefore conductive function, between first sets of contacts 202 and 206, 212 and 216, and 222 and 226, and second sets of contacts 204 and 208, 214 and 218, and 224 and 228, respectively. Additionally, no direct contact exists between latch 116 and latch lever 118. In this case, no current flows through the circuit breaker.

Turning to FIG. 2B, the same componentry is illustrated as in FIG. 2A, however circuit breaker 100 is in an on state (i.e., turned on, in an on mode, with current flowing). When the circuit breaker is turned on, conducting switch element 210, conducting switch element 220, and conducting switch element 230 physically move to join first set of contacts 202 and 206 with second set of contacts 204 and 208 to form the conducting pairs 236 and 238. Similarly, the first set of contacts 212 and 216 join with second set of contacts 214 and 218 to form the conducting pairs 240 and 242. Also, the first set of contacts 222 and 226 join with second set of contacts 224 and 228 to form the conducting pairs 248 and 244. Once joined, conducting pairs 236 and 238 forms a conducting pathway via conducting switch element 210 to allow current to flow through the first switch mechanism. Similarly, conducting pairs 240 and 242 for a conducting pathway via conducting switch element 220 to allow current to flow through the second switch mechanism. Also, conducting pairs 248 and 244 for a conducting pathway via conducting switch element 230 to allow current to flow through the third switch mechanism.

FIG. 2C illustrates the same componentry as in FIGS. 2A and 2B, but circuit breaker 100 is in the trip state (i.e., tripped, and current is not flowing). Here, thermal temperature changes within circuit breaker 100 exceed a threshold value, causing actuation of the working bimetals (not pictured), the differential lever (not pictured), and compensation bimetal (not pictured), and the tripping pin (not pictured), resulting in rotation of latch 116. In this position, latch 116 no longer acts as an obstruction to latch lever 118. This allows latch lever 118 to shift to a position associated with a trip of the circuit breaker 100. Movement of latch lever 118 to this position causes the mechanical separation of conducting pairs 236, 238, 240, 242, 244, and 248, which stops the flow of current through the circuit breaker 100.

Figure 3:
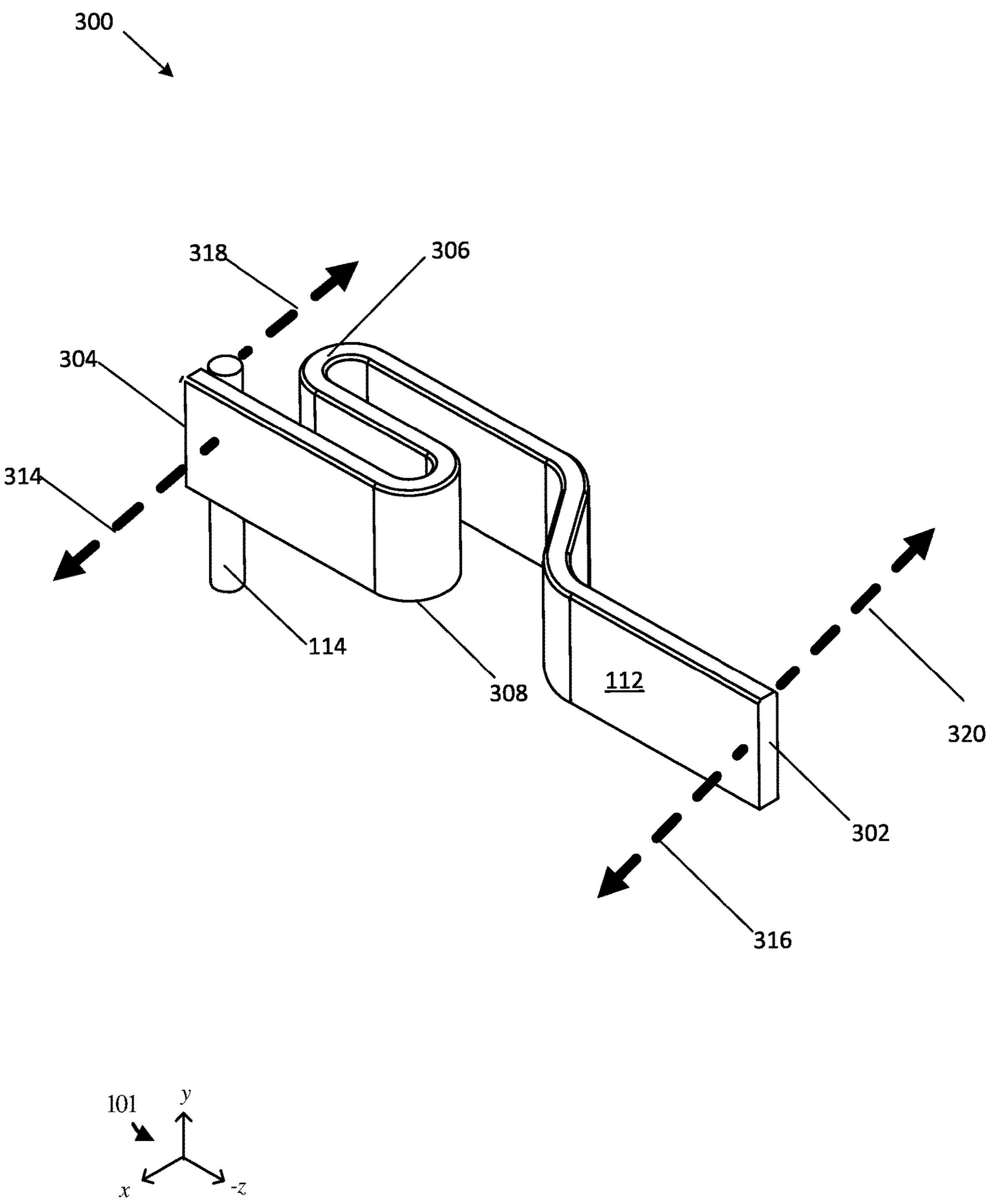
FIG. 3 illustrates a decoupled view of a compensation bimetal, according to some embodiments.

FIG. 3 illustrates a decoupled view 300 of compensation bimetal 112 removed from circuit breaker 100 for ease of viewing. Decoupled view 300 of compensation bimetal 112 is provided to describe additional detail of compensation bimetal 112. As shown in FIG. 3, compensation bimetal 112 includes a first end 302, a second end 304, a first bend 306, a second bend 308, and tripping pin 114. FIG. 3 further illustrates directional vectors 314, 316, 318, and 320 and three-dimensional coordinate axis 101. Vectors 314, 316, 318, and 320 are not representative of magnitude, but rather a direction of mechanical displacement caused by thermal expansion of the compensation bimetal 112. Vectors 314 and 316 represent movement in the +x direction. Vectors 318 and 320 represent movement in the −x direction.

As discussed above, compensation bimetal 112 is a multi-metallic strip. The multi-metallic strip may be a bimetallic strip, a trimetallic strip, or a tetra-metallic strip, for example. The type of multi-metallic strip used may be selected based on expected ambient temperature fluctuations for the given environment of use. Circuit breaker 100 may be an industrial automation circuit breaker, and operating conditions may vary drastically and include environments that are dirty or clean, hot or cold, humid or dry, or any combination. A bimetallic strip is composed of two metals having different coefficients of thermal expansion, a trimetallic strip is composed of three metals having different coefficients of thermal expansion, and a tetra-metallic strip is composed of four metals having different coefficients of thermal expansion. Bimetallic strips, trimetallic strips, and tetra-metallic strips all constitute multi-metallic strips, all of which experience mechanical displacement when heated or cooled based on the composition of materials that expand or contract at different rates due to their coefficients of thermal expansion. Multi-metallic strips are classified in part based on their operating temperatures and mechanical deflection. For example, compensation bimetal 112 may be a two-layer bimetallic strip of the TB 150 or TB 200 class. Compensation bimetal 112 may have a uniform thickness, which extends along the x axis, and a uniform width, which extends along the y axis. Tripping pin 114 may be made of metal or plastic and may be adhered to compensation bimetal 112. In some embodiments, tripping pin 114 is made of metal and is welded to compensation bimetal 112.

Compensation bimetal 112 flexes (also described as mechanical displacement or mechanical deflection herein) in response to ambient temperature changes to reciprocate for the flexing of the working bimetal 102, 104, 106. In an embodiment, the geometry of the compensation bimetal supports an operational temperature range of negative five degrees Celsius to forty degrees Celsius. Accordingly, while in the operational temperature range, compensation bimetal 112 flexes sufficiently to compensate for any flexing of working bimetal 102, 104, 106 in response to the ambient temperature changes in that range. By compensating for ambient temperature fluctuations, tripping pin 114 will not move past the threshold movement to cause a trip of circuit breaker 100 by pushing latch 116 past the point of releasing latch lever 118.

Compensation bimetal 112 flexes because the multi-metallic material of the compensation bimetal 112 attempts to expand as ambient temperatures increase and displaces first end 302 in the direction of vector 316 and second end 304 in the direction of vector direction 314 (i.e., the +x direction). In contrast, where temperature fluctuations amount to a decrease in temperature, the multi-metallic material of the compensation bimetal 112 attempts to contract and displaces first end 302 in the direction of vector 320 and second end 304 in the direction of vector 318 (i.e., in the −x direction).

The addition of first bend 306 and second bend 308 increase the sensitivity and flexing of compensation bimetal 112 in response to ambient temperatures changes compared to a compensation bimetal having no bends. By introducing first bend 306 and second bend 308, the amount of expansion required to deform the strip beyond the ability to actuate tripping pin 114 more than a threshold movement is increased. The opposing concavity of the first bend 306 and second bend 308 increase the ability to deform because a longer bimetallic strip is more sensitive to small temperature fluctuations. Compensation bimetal 112 does not experience thermal changes due to increased current flow directly because compensation bimetal 112 is not conductively coupled to the switching mechanisms, so flexing is only due to ambient temperature changes.

Figure 4:
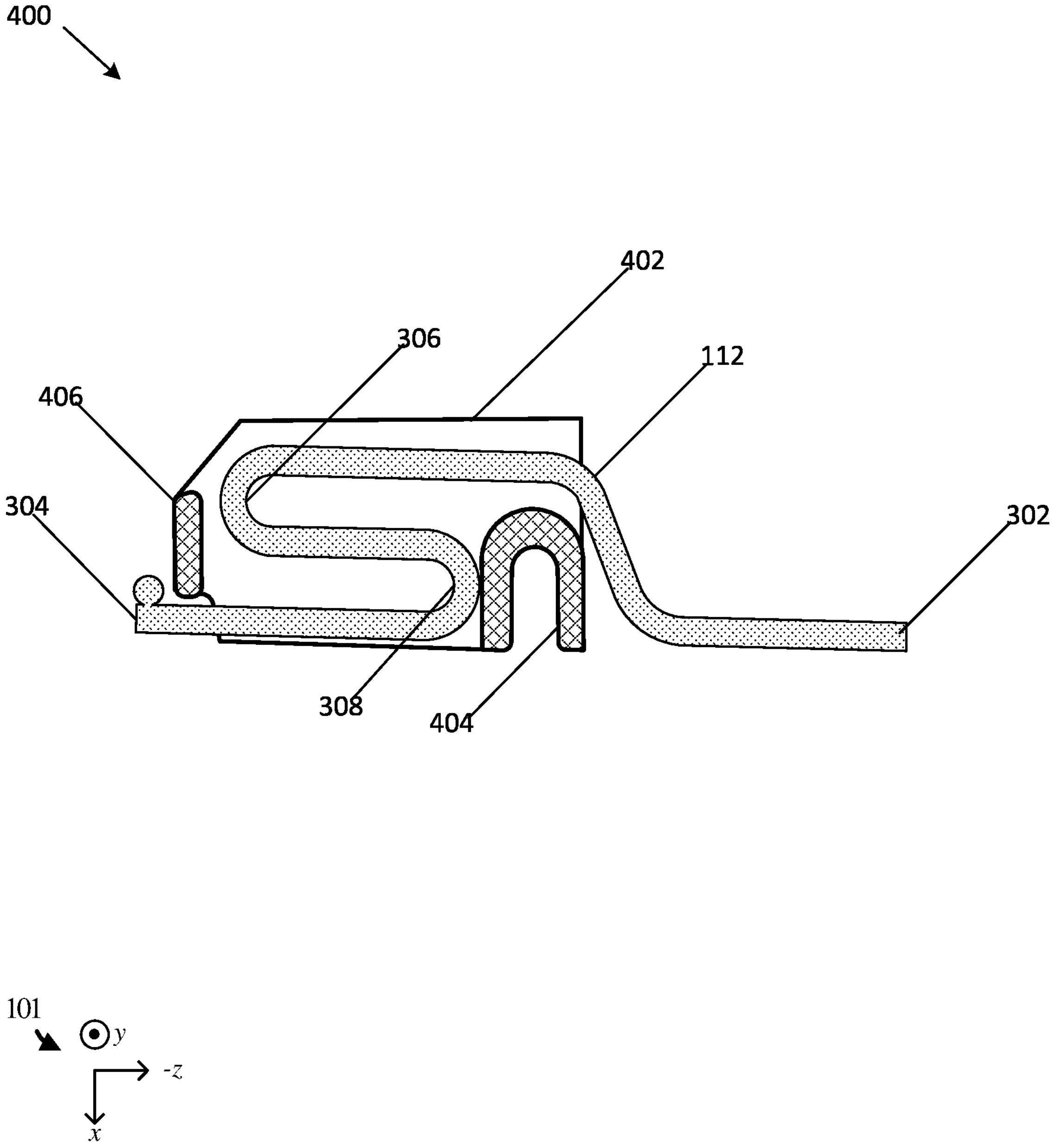
FIG. 4 illustrates a view of a compensation bimetal holder, according to some embodiments.

FIG. 4 illustrates a view 400 of compensation bimetal 112 contained within compensation bimetal holder 402 in accordance with an embodiment of the disclosed technology. View 400 is illustrated without the top portion of compensation bimetal holder 402 to demonstrate the interior volume of compensation bimetal holder 402 and relevant interactions with compensation bimetal 112. Compensation bimetal holder 402 includes fixed fulcrum 404 and side 406. The compensation bimetal holder 402 is made of any suitable material including plastic or other nonconductive material.

Compensation bimetal 112 includes first bend 306 and second bend 308. First bend 306 has an apex proximate to side 406 of compensation bimetal holder 402. Second bend 308 has an apex proximate to fixed fulcrum 404. Compensation bimetal 112 length is increased by bending it at least twice, in this case to form an "S" shape. Accordingly, the centroids of first bend 306 and second bend 308 are coplanar in the x-z plane. First bend 306 and second bend 308 each form a 180-degree reversal of compensation bimetal 112. First bend 306 and second bend 308 have radii that are substantially the same. In some embodiments, the radii are as small as possible while first bend 306 and second bend 308 remain uniform, the centroids remain coplanar, and the material is not pinched at the apex of either bend. In some embodiments, first bend 306 and second bend 308 are not coplanar, do not have the same radius, or both. In some embodiments, there are more than two bends.

The bottom of compensation bimetal holder 402, the fixed fulcrum 404, the side 406, and the top of compensation bimetal holder 402 (not pictured) act to encase the otherwise unfixed compensation bimetal 112. Compensation bimetal 112 includes first end 302 and second end 304. Fixed fulcrum 404 acts as a pivot point between first end 302 and second end 304 so that when first end 302 is actuated by the differential lever (not pictured) in the +x direction, second end 304 is displaced by a lever force in the −x direction. When the lever force is sufficient to overcome compensation bimetal flexing at the second end 304 in the +x direction, tripping pin 114 will move latch 116 sufficiently to release latch lever 118 and put the circuit breaker in the trip mode (i.e., cause the tripping event). However, ambient temperature fluctuations within a range of operating temperatures (e.g., negative five degrees Celsius to forty degrees Celsius; −5 C-40 C) do not move tripping pin 114 past the threshold movement. This is because the total movement experienced by tripping pin 114 includes (A) movement in the −x direction due to the lever action of the extension 111 of differential lever 110 in the +x direction on the first end 302 caused by flexing of working bimetal 102, 104, 106 and (B) movement in the +x direction caused by the second end 304 flexing due to ambient temperature increases. Note further than flexing of the first end 302 in the +x direction further limits the lever action of compensation bimetal 112 around the fixed fulcrum 404.

Note further that compensation bimetal 112 is not fixed to extension 111 of differential lever 110. Accordingly, when working bimetal 102, 104, 106 flex in the −x direction due to temperature decreases, compensation bimetal 112 may also flex such that second end 304 flexes in the −x direction. However, the force of the movement is not sufficient to trigger a tripping event by forcing tripping pin 114 over the threshold movement because compensation bimetal 112 may rotate about the fixed fulcrum 404 sufficiently until the first end 302 physically contacts extension 111.

The openings of the compensation bimetal holder 402 do not impede movement of first end 302 or second end 304. The additional space on the interior of compensation bimetal holder 402 allows the entire compensation bimetal 112 to adjust its position inside the compensation bimetal holder. Accordingly, compensation bimetal holder 402 allows compensation bimetal 112 to be self-aligning.

Figure 5:
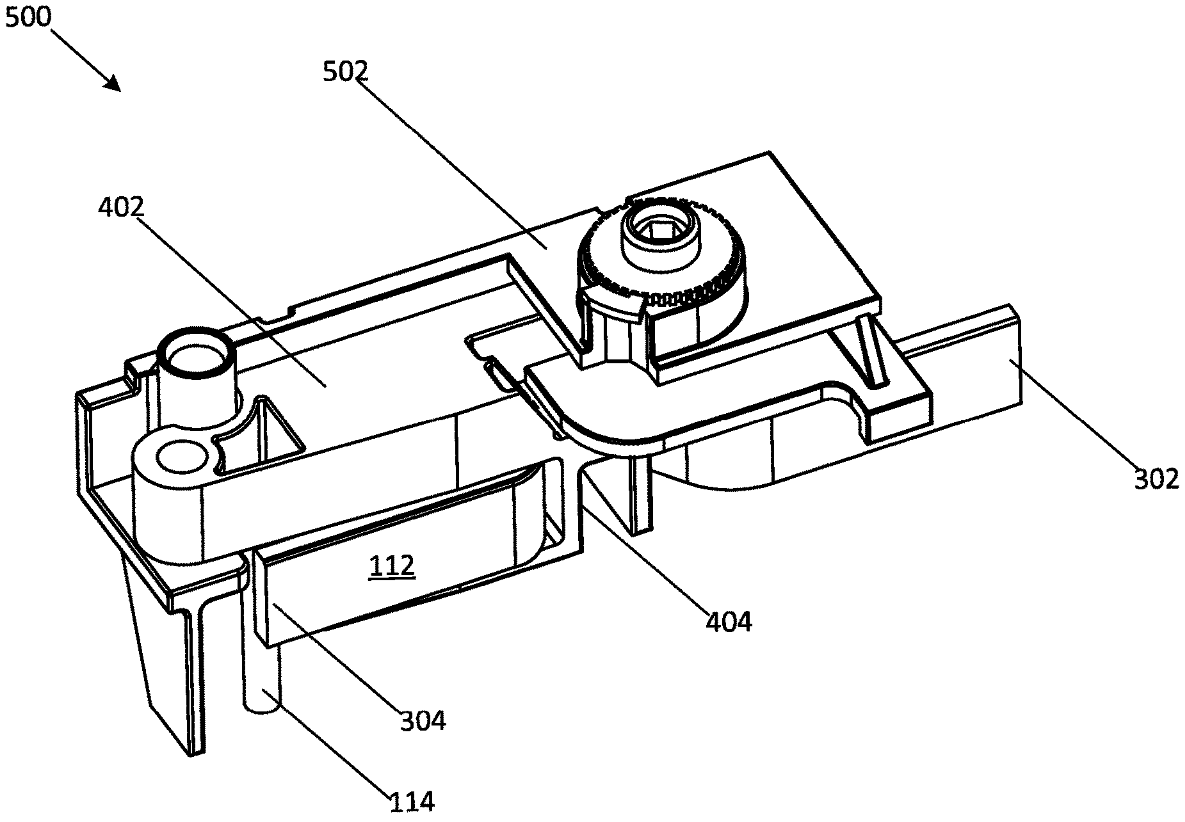
FIG. 5 illustrates a compensation bimetal housing, according to some embodiments.

FIG. 5 illustrates additional detail in view 500 showing compensation bimetal 112 contained with compensation bimetal holder 402, contained within compensation bimetal housing 502. In view 500, compensation bimetal 112 including first end 302 and second end 304, and tripping pin 114 are visible. Compensation bimetal holder 402 including fixed fulcrum 404 can also be seen. Compensation bimetal housing 502 is shown to provide additional detail of how compensation bimetal 112 is enclosed within circuit breaker 100. Compensation bimetal housing 502 may be made of any suitable material including plastic or any other nonconductive material. Compensation bimetal housing 502 supports compensation bimetal holder 402 and may be fixed to other components or the housing of circuit breaker 100. Compensation bimetal housing 502 does not impede movement of compensation bimetal 112.

Once placed into compensation bimetal holder 402 and compensation bimetal housing 502 respectively, compensation bimetal 112 is self-aligning such that it will interact with latch 116 and differential lever 110 as discussed above. Advantageously, the ease of installing compensation bimetal 112 into compensation bimetal holder 402, and compensation bimetal holder 402 into compensation bimetal housing 502 promotes a high degree of efficiency for manufacturing and maintenance. Compensation bimetal 112 can be placed into compensation bimetal holder 402, and compensation bimetal holder 402 can be placed into compensation bimetal housing 502 without any fine adjustment of components and without fixing compensation bimetal 112 to any other component. As such, the speed of installing a thermal compensation system using compensation bimetal 112 and the other components described herein is greatly improved over existing designs.

Figure 6:
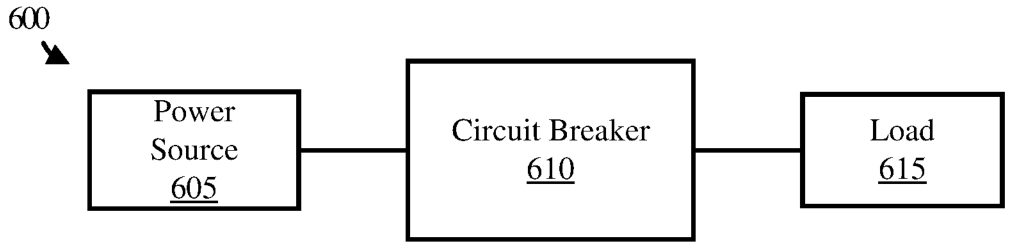
FIG. 6 illustrates an example system, according to some embodiments.

FIG. 6 illustrates circuit 600 in which a circuit breaker in accordance with the present disclosure may be implemented. Circuit 600 includes power source 605, circuit breaker 610, and load 615. Circuit 600 may include fewer or additional components as compared to what is shown in the example of FIG. 6.

Power source 605 is representative of any device or electrical component delivering power into circuit 600. Power source 605 may be an independent voltage source, a dependent voltage source, or other type of voltage source. Examples of such power sources include generators, photovoltaic cells, thermopiles, primary-cell batteries, a power grid, and the like. Power source 605 creates electrical voltage that causes current to flow through circuit 600 via one or more connecting wires or other connection components. Load 615 is representative of any device or electrical component that consumes electrical energy. Load 615 may represent a resistive load, inductive load, capacitive load, or combined load. Examples of loads include electric lamps, air conditioners, motors, resistors, heaters, processors, precision manufacturing equipment, data servers, pumps, fans, generators, robotic machinery, industrial automation controllers, and the like. Circuit breaker 610 is representative of any circuit breaker in accordance with the technology disclosed herein. For example, circuit breaker 610 may be representative of circuit breaker 100 from the preceding figures. Circuit breaker 610 may alternatively be representative of a circuit breaker system that differs from circuit breaker 100 but nonetheless includes compensation bimetal 112 or a similar component that operates in a similar manner to compensation bimetal 112.

In accordance with the example of FIG. 6, current flows from power source 605 to load 615. Circuit breaker 610 protects circuit 600, including power source 605 and load 615, by stopping the flow of current in cases of short circuit or overload. Thus, in accordance with the present disclosure, circuit breaker 610 is a circuit breaker that may include, for example, thermal tripping elements, magnetic tripping elements, microprocessor tripping elements, electronic tripping elements, or a combination thereof. Circuit breaker 610 further includes one or more compensation bimetal, such as compensation bimetal 112 from the preceding figures, configured to prevent circuit breaker 610 from triggering a thermal trip in response to ambient temperature fluctuations. Circuit breaker 610 may open circuit 600 to stop current flow when an over-current condition or short circuit condition occurs.

The above description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Unless the context clearly requires otherwise, throughout the description and the claims, the words “include,” “comprise,” “comprising,” and the like are to be construed in an inclusive sense, as opposed to an exclusive or exhaustive sense; that is to say, in the sense of “including, but not limited to.” As used herein, the terms “connected,” “coupled,” or any variant thereof means any connection or coupling, either direct or indirect, between two or more elements. Additionally, the words “herein,” “above,” “below,” and words of similar import, when used in this application, refer to this application as a whole and not to any particular portions of this application. Where the context permits, words in the above Detailed Description using the singular or plural number may also include the plural or singular number, respectively. The word “or” in reference to a list of two or more items, covers all of the following interpretations of the word: any of the items in the list, all of the items in the list, and any combination of the items in the list.

The phrases “in some embodiments,” “according to some embodiments,” “in the embodiments shown,” “in other embodiments,” and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description is not intended to be exhaustive or to limit the technology to the precise form disclosed above. While specific examples of the technology are described for illustrative purposes, various equivalent modifications are possible within the scope of the technology, as those skilled in the relevant art will recognize. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in several ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A circuit breaker, comprising:
- a working bimetal having a first end and a second end, wherein:
  - the first end is coupled to a switch mechanism,
  - the working bimetal flexes based on thermal changes, and
  - the thermal changes comprise ambient temperature changes and switch mechanism temperature changes; and
- a compensation bimetal comprising a multi-metallic strip having a first end and a second end, wherein:
  - the multi-metallic strip flexes in response to the ambient temperature changes,
  - the first end of the compensation bimetal is coupled to the second end of the working bimetal via a differential lever,
  - the second end of the compensation bimetal is coupled to a tripping pin,
  - a length of the multi-metallic strip is longer than a distance between the differential lever and the tripping pin,
  - the multi-metallic strip extends in a direction away from the first end of the compensation bimetal toward the second end of the compensation bimetal, and
  - the multi-metallic strip comprises at least two bends that each reverse the direction of the multi-metallic strip.

2. The circuit breaker of claim 1, further comprising:
- the switch mechanism comprising a first set of contacts and a second set of contacts, wherein:
  - current flows through the switch mechanism when the switch mechanism is in a first position comprising the first set of contacts physically contacting the second set of contacts,
  - the current does not flow through the switch mechanism when the switch mechanism is in a second position comprising the first set of contacts being physically separated from the second set of contacts, and
- the switch mechanism temperature changes occur in response to the current flowing through the switch mechanism.

3. The circuit breaker of claim 1, wherein the working bimetal is associated with a first phase of a three-phase power source, the circuit breaker further comprising:
- three switch mechanisms, wherein the switch mechanism is one of the three switch mechanisms, and wherein each switch mechanism is associated with one of the three phases of the three-phase power source; and
- a second working bimetal and a third working bimetal, wherein each working bimetal is associated with one of the three phases of the three-phase power source.

4. The circuit breaker of claim 1, further comprising:
- the differential lever, wherein a movement of the differential lever is in response to flexing of the working bimetal in response to the thermal changes;
- the tripping pin, wherein a movement of the tripping pin is in response to a total movement of the compensation bimetal, and wherein the total movement of the compensation bimetal comprises a first movement in response to the movement of the differential lever and a second movement comprising flexing of the compensation bimetal in response to the ambient temperature changes; and
- a latch, wherein the latch is actuated by the tripping pin in response to the movement of the tripping pin exceeding a threshold movement.

5. The circuit breaker of claim 4, wherein, in response to a rotation of the latch by the threshold movement of the tripping pin of the compensation bimetal, the circuit breaker separates a first set of conducting contacts and a second set of conducting contacts stopping current flow through the circuit breaker.

6. The circuit breaker of claim 4, wherein the flexing of the working bimetal is in response to a first ambient temperature change of the ambient temperature changes and the flexing of the compensation bimetal is in response to the first ambient temperature change to compensate for the flexing of the working bimetal resulting in the total movement of the compensation bimetal that causes the movement of the tripping pin to not exceed the threshold movement.

7. The circuit breaker of claim 1, wherein the multi-metallic strip of the compensation bimetal is selected from the group consisting of a bimetallic strip, a trimetallic strip, and a tetra-metallic strip.

8. The circuit breaker of claim 1, further comprising:
- a compensation bimetal holder comprising a three-dimensional enclosure having an interior volume, two or more openings, and a fixed fulcrum within the interior volume of the three-dimensional enclosure.

9. The circuit breaker of claim 8, wherein:
- the compensation bimetal is self-aligning upon placement into the compensation bimetal holder;
- the compensation bimetal is not anchored to the compensation bimetal holder;
- a first bend of the at least two bends of the multi-metallic strip has an apex proximate to an edge of the compensation bimetal holder; and
- a second bend of the at least two bends of the multi-metallic strip has an apex proximate to the fixed fulcrum of the compensation bimetal holder.

10. The circuit breaker of claim 1, wherein the at least two bends of the multi-metallic strip comprise a first bend and a second bend, the first bend and the second bend each having a radius that are substantially the same.

11. The circuit breaker of claim 1, wherein the differential lever is plastic.

12. A thermal tripping mechanism, comprising:

a compensation bimetal comprising a multi-metallic strip having a first end and a second end, wherein:

the multi-metallic strip flexes in response to ambient temperature changes, the first end is coupled to a first end of a working bimetal via a differential lever, the second end is coupled to a tripping pin, a length of the multi-metallic strip is longer than a distance between the differential lever and the tripping pin, the multi-metallic strip extends in a direction away from the first end toward the second end, and the multi-metallic strip comprises at least two bends that each reverse the direction of the multi-metallic strip.

13. The thermal tripping mechanism of claim 12, further comprising:

the differential lever, wherein a movement of the differential lever is in response to flexing of the working bimetal in response to thermal changes;

the tripping pin, wherein a movement of the tripping pin is in response to a total movement of the compensation bimetal, and wherein the total movement of the compensation bimetal comprises a first movement in response to the movement of the differential lever and a second movement comprising flexing of the compensation bimetal in response to the ambient temperature changes; and a latch, wherein the latch is actuated by the tripping pin in response to the movement of the tripping pin exceeding a threshold movement.

14. The thermal tripping mechanism of claim 13, wherein the flexing of the working bimetal is in response to a first ambient temperature change of the ambient temperature changes and the flexing of the compensation bimetal is in response to the first ambient temperature change to compensate for the flexing of the working bimetal resulting in the total movement of the compensation bimetal that causes the movement of the tripping pin to not exceed the threshold movement.

15. The thermal tripping mechanism of claim 12, wherein the multi-metallic strip of the compensation bimetal is selected from the group consisting of a bimetallic strip, a trimetallic strip, and a tetra-metallic strip.

16. The thermal tripping mechanism of claim 12, further comprising:

a compensation bimetal holder comprising a three-dimensional enclosure having an interior volume, two or more openings, and a fixed fulcrum within the interior volume of the three-dimensional enclosure.

17. The thermal tripping mechanism of claim 16, wherein:

the compensation bimetal is self-aligning upon placement into the compensation bimetal holder;

the compensation bimetal is not anchored to the compensation bimetal holder;

a first bend of the at least two bends of the multi-metallic strip has an apex proximate to an edge of the compensation bimetal holder; and a second bend of the at least two bends of the multi-metallic strip has an apex proximate to the fixed fulcrum of the compensation bimetal holder.

18. The thermal tripping mechanism of claim 12, wherein the at least two bends of the multi-metallic strip comprise a first bend and a second bend, the first bend and the second bend each having a radius that are substantially the same.

19. The thermal tripping mechanism of claim 12, wherein the differential lever is plastic.

* * * * *